March 8, 1932.　　　C. CRESCI　　　1,848,321
AIRCRAFT
Filed Jan. 21, 1930　　3 Sheets-Sheet 1
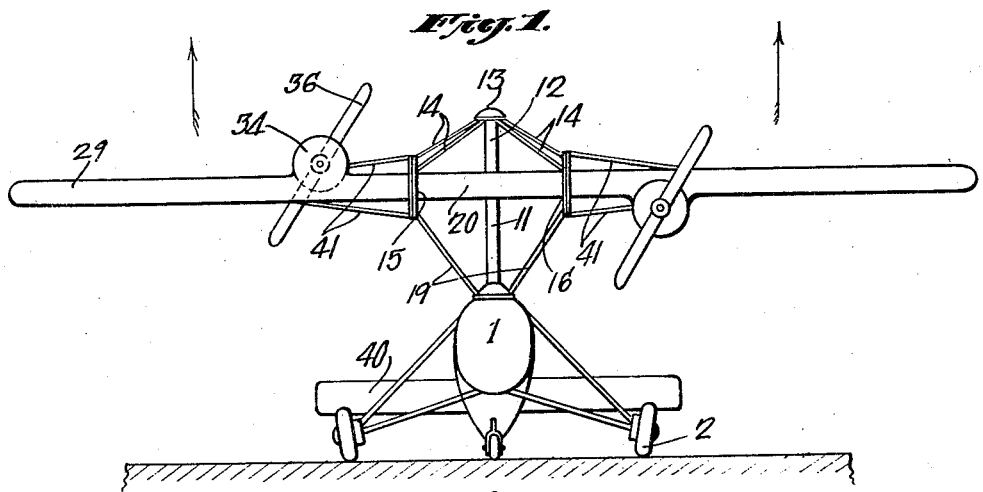
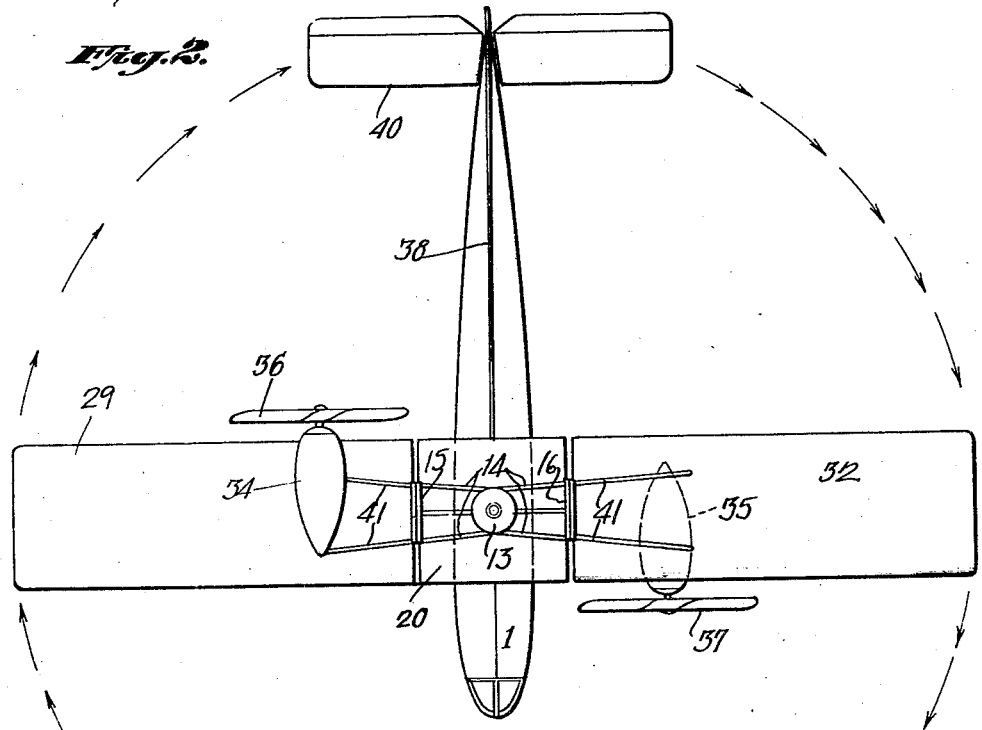
Inventor
CARLO CRESCI.
By Clarence A. O'Brien
Attorney March 8, 1932. C. CRESCI 1,848,321
AIRCRAFT
Filed Jan. 21, 1930   3 Sheets-Sheet 2
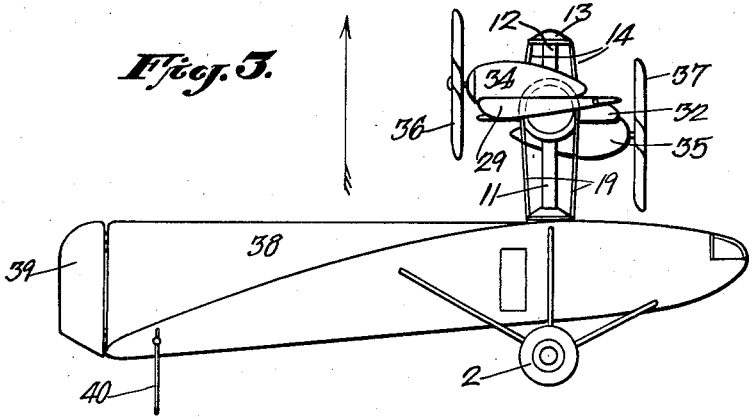
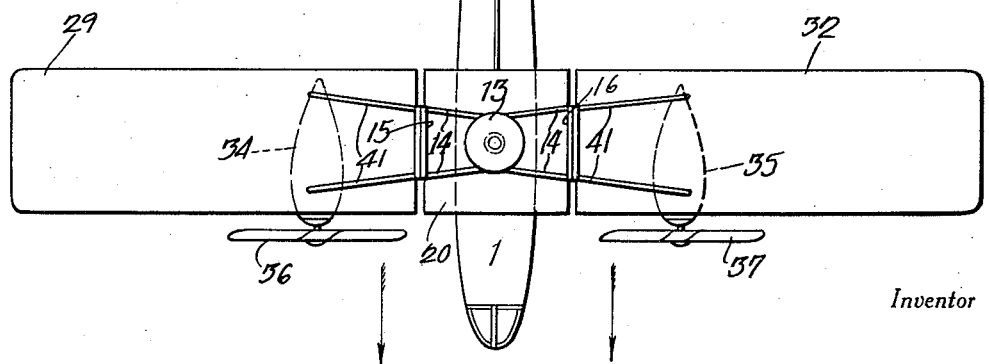
Inventor
CARLO CRESCI.
By Clarence A. O'Brien
Attorney

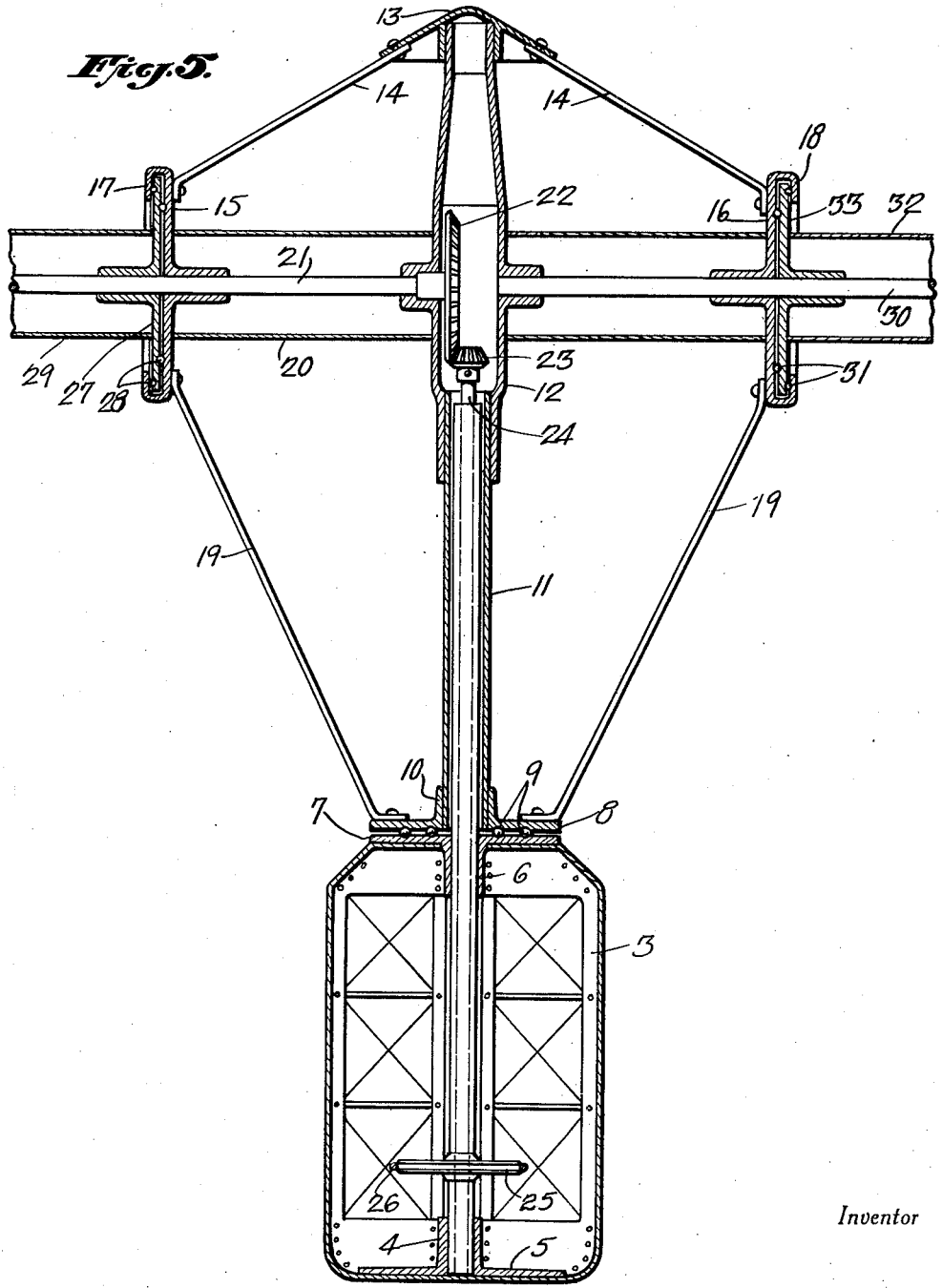

Patented Mar. 8, 1932                                                                                          1,848,321

UNITED STATES PATENT OFFICE

CARLO CRESCI, OF MERCED, CALIFORNIA

AIRCRAFT

Application filed January 21, 1930. Serial No. 422,346.

This invention relates to aircrafts and more particularly to aircrafts of the monoplane type which is provided with a propelling motor suspended beneath each wing on opposite sides of the fuselage but it is to be understood that this invention may be utilized in connection with any type of aircraft for which the same may be adapted.

An important object of the invention is to provide, in a manner as hereinafter set forth, an aircraft of the aforementioned character which embodies means whereby the same may be flown in horizontal flight and controlled in the manner of a conventional aeroplane or whereby the same may be caused to ascend or descend vertically, as when it is desired to take off from or alight in a restricted area.

Another important object of the invention is to provide an aircraft of the above mentioned character wherein the same wings and power units are utilized for sustaining and driving the aircraft when the same is traveling horizontally as an aeroplane or when it is functioning in the manner of a helicopter.

A still further object of the invention is to provide an aircraft of the aforementioned character which embodies manually operable means for expeditiously causing the rotation of one of the wings and power units thereon one-half of a revolution when it is desired to convert the aircraft from an aeroplane to a helicopter and vice versa.

A still further important object of the invention is to provide, in a manner as hereinafter set forth, an aircraft of the aforementioned character which embodies means mounted on the fuselage to resist rotation of said fuselage in a horizontal plane when the wings are rotating to lift or lower the craft vertically and which further embodies an elevator which may be shifted to a vertical position to reduce resistance to vertical movement of the aircraft.

Still further objects of the invention are to provide an aircraft of the character set forth which will be simple in construction, strong, durable, efficient in its use and which may be manufactured at low cost.

The foregoing and still further objects and advantages of the invention will become apparent from a study of the following specification, taken in connection with the accompanying drawings, wherein like characters of reference designate corresponding parts throughout the several views, and wherein:—

Figure 1 is a view in front elevation of an aircraft constructed in accordance with this invention, the same being shown with the wings and power units in position for lifting the craft vertically.

Figure 2 is a view in top plan of the invention as illustrated in Figure 1.

Figure 3 is a view in side elevation of the aircraft with the different parts thereof in the positions which they assume when the craft ascends or descends vertically.

Figure 4 is a top plan view of the invention with the parts thereof in position for flight in a horizontal plane.

Figure 5 is a detail view in vertical section showing the wing supporting means and the manually actuated mechanism for shifting one of said wings and the power units thereof.

Referring to the drawings in detail, the reference character 1 designates the fuselage of the aircraft, the upper side of which is curved downwardly toward the rear from an intermediate portion thereof and merges with the lower side thereof to provide a substantially pointed rear end as best illustrated in Figure 3 of the drawings. The fuselage 1 is mounted on the wheeled landing gear designated by the reference numeral 2.

Within the fuselage 1 at a point rearwardly of the forward end thereof, there is provided a metallic skeleton frame work 3 in the lower end of which is mounted the vertically disposed bearing sleeve 4 having the right angularly disposed base portion 5 integral on the lower end thereof. A complementary bearing sleeve 6 is mounted on the upper end of the skeleton frame 3 in vertical alignment with the bearing sleeve 4 and said sleeve 6 extends upwardly through the upper side of the fuselage and is provided with a horizontally disposed flat supporting plate 7, as best illustrated in Figure 5 of the drawings. A turntable 8 is mounted for rotation on the supporting plate 7 and anti-friction balls 9 are disposed between said turntable and said supporting plate. The turn table 8 is provided with a central opening from which extends a vertical sleeve 10 which is in alignment with the bearing sleeves 4 and 6. A tubular standard 11 has its lower end fixed in the sleeve 10 and extends vertically therefrom. A housing 12 is fixed on the upper end portion of the tubular standard 11 and is in communication therewith, as clearly illustrated in Figure 5 of the drawings. A conical cap member 13 is mounted over the upper end of the housing 12 in a manner to close the same and said cap is provided with an inclined skirt portion to which is anchored the upper end portion of a plurality of supporting braces 14. The outer ends of the braces 14 are anchored to the inner sides of the vertically disposed bearing plates or members 15 and 16 which in turn are provided with the inturned channel forming flanges 17 and 18, respectively. Supporting braces 19 also extend upwardly from the marginal portion of the turn table 8 to which their lower ends are anchored, to the lower portions of the bearing plates 15 and 16.

A central wing section 20 is rigidly mounted on the housing 12 and encircles the same and extends outwardly on the opposite sides thereof to the bearing plates 15 and 16. A horizontally disposed shaft 21 is mounted for rotation and supported in the bearing plate 15 and the housing 12 and extends into said housing and has fixed on its inner end the beveled gear 22 which meshes with a beveled pinion gear 23 fixed on the upper end portion of the vertically disposed shaft 24 which is mounted for rotation in the tubular standard 11 and the bearing sleeves 4 and 6. A pulley 25 is fixed on the shaft 24 adjacent its lower end and has trained thereover the belt or cable 26 which extends to a point convenient for actuation by the operator of the aircraft or other person.

A vertically disposed wing supporting plate 27 is fixed on the shaft 21 and mounted for rotation in the channel formed by the plates 15 and its flange 17 and anti-friction balls 28 are disposed between said wing supporting plate and the elements 15 and 17. A reversible wing 29 is fixed on the plate 27 and the shaft 21 extends outwardly into said wing. The outer portion of the shaft 21 is to be rigidly connected to adjacent portions of the wing 29 at a plurality of points throughout its length to insure a connection of sufficient strength between the shaft and wing to cause said wing to rotate with the said shaft at all times.

A fixed shaft 30 is rigidly mounted in the bearing plate 16 and the side of the housing 12 and is in longitudinal alignment with the shaft 21. A stationary wing 32 is rigidly mounted on a wing supporting plate 33 which is mounted in the channel formed by the plate 16 and its flange 18 and said plate is fixed on the shaft 30. The shaft 30 also extends outwardly through the wing 32 and may be rigidly connected thereto at different points in the same manner in which the wing 29 is connected to the shaft 21.

Power units in the form of engines 34 and 35 are supported on the lower sides of the wings 29 and 32, respectively, and the propellers 36 and 37 are operatively connected to said engines 34 and 35, respectively for actuation thereby in the usual manner.

A vertically disposed longitudinally extending fin 38 is mounted on the upper side of the fuselage 1 and extends substantially from the untapered portion thereof to the rear end thereof, as clearly illustrated in Figure 3 of the drawings. The fin 38 is of substantially triangular configuration and hingedly mounted on the rear end thereof is the vertically disposed rudder 39. Adjacent its rear end, a horizontally disposed elevator 40 is pivotally mounted for swinging movement in a vertical plane and said elevator is adapted to be disposed in the position illustrated in Figure 3 of the drawings for a purpose which will be presently set forth.

In operation, when it is desired that the aircraft fly forwardly in substantially a horizontal plane after the manner of a conventional aeroplane, the shiftable wing 29 is disposed in the position indicated in Figure 4 of the drawings and the propellers 36 and 37 will, of course, pull the craft forward. The elevator 40 is swung to a substantially horizontal position by means of the usual control mechanism therefor, not shown. When it is desired to cause the aircraft to ascend or descend in a substantially vertical plane, after the manner of a helicopter, an operator rotates the shaft 21 through the medium of the meshed gears 22 and 23, the shaft 24, pulley 25 and actuating belt or cable 26 to rotate the shiftable wing 29 substantially one-half of a revolution on the wing supporting plate 15 in a manner to disclose the propeller 36 and the entering edge of said wing rearwardly, as illustrated in Figures 1, 2 and 3 of the drawings. In this position the engine 34 will be disposed above the wing 29 and with both of the engines in operation, the wings 29, and 32 and the central wing section 20 will be caused to rotate as a unit in a horizontal plane as indicated by the arrows in Figure 2 of the drawings and said wing will thus function as a propeller in a manner to exert a vertical pull or lift. All of the supporting structure for the wing rotates therewith through the medium of the turn table 9 mounted on the supporting plate or flange 7. The reference numeral 41 designates braces which extend from the upper and lower portions of the wing supporting plates 27 and 33 to intermediate portions of wings 29 and 32 for strengthening the same.

It is believed that the many advantages of an aircraft constructed in accordance with this invention will be readily understood, and although the preferred embodiment of the invention is as illustrated and described, it is to be understood that changes in the details of construction may be had which will fall within the scope of the invention as claimed.

What is claimed is:—

1. An aircraft of the character described comprising a fuselage, a wing supporting structure mounted for rotation on a vertical axis on the fuselage, a wing rigidly mounted on the supporting structure and extending laterally therefrom, a wing rotatably mounted on the supporting structure and extending laterally therefrom, means on the wings for pulling the aircraft forwardly, and manually operable means for rotating the last named wing through one hundred eighty degrees, (180°) in a manner to reverse the same and cause the rotation of both wings as a unit in a horizontal plane on the fuselage when the pulling means is in operation to exert a vertical lift on said fuselage.

2. An aircraft of the character described comprising a fuselage, a wing supporting structure mounted for rotation on a vertical axis on the fuselage, a wing rigidly mounted on the supporting structure and extending laterally therefrom, a wing rotatably mounted on the supporting structure and extending laterally therefrom in an opposite direction from the first named wing, power units on the wings for pulling the aircraft forwardly, manually operable means for rotating the last named wing through one hundred eighty degrees, (180°) in a manner to reverse the same and cause the rotation of both wings as a unit in a horizontal plane on the fuselage when the power units are in operation to exert a vertical lift on said fuselage, and a vertically disposed longitudinally extending fin mounted on the fuselage rearwardly of the wing supporting structure to prevent rotary movement of the fuselage with the wings.

3. An aircraft of the character described comprising a fuselage, a wing supporting structure mounted for rotation on a vertical axis on the fuselage, a central wing section rigidly mounted on the supporting means, a wing rigidly mounted on one side of the supporting structure and extending laterally therefrom, a wing rotatably mounted on the opposite sides of the supporting structure and extending laterally therefrom, said wing having rotary movement through one hundred eighty degrees (180°), an engine mounted on each of the laterally extending wings, a propeller operatively connected to each of the engines, said engines and propellers adapted to pull the aircraft forwardly when both of the propellers are disposed forwardly of the wings, manually operable means for rotating the last named laterally extending wing through one hundred eighty degrees, (180°) in a manner to dispose the propeller thereon rearwardly to rotate both of the laterally extending wings and the central wing section as a unit in a horizontal plane on the fuselage when the engines are in operation to exert a vertical lift on said fuselage and an upstanding longitudinally extending fin mounted on the fuselage rearwardly of the wing supporting structure and adapted to prevent rotary movement of said fuselage with the wings.

In testimony whereof I affix my signature.

CARLO CRESCI.